UNITED STATES PATENT OFFICE.

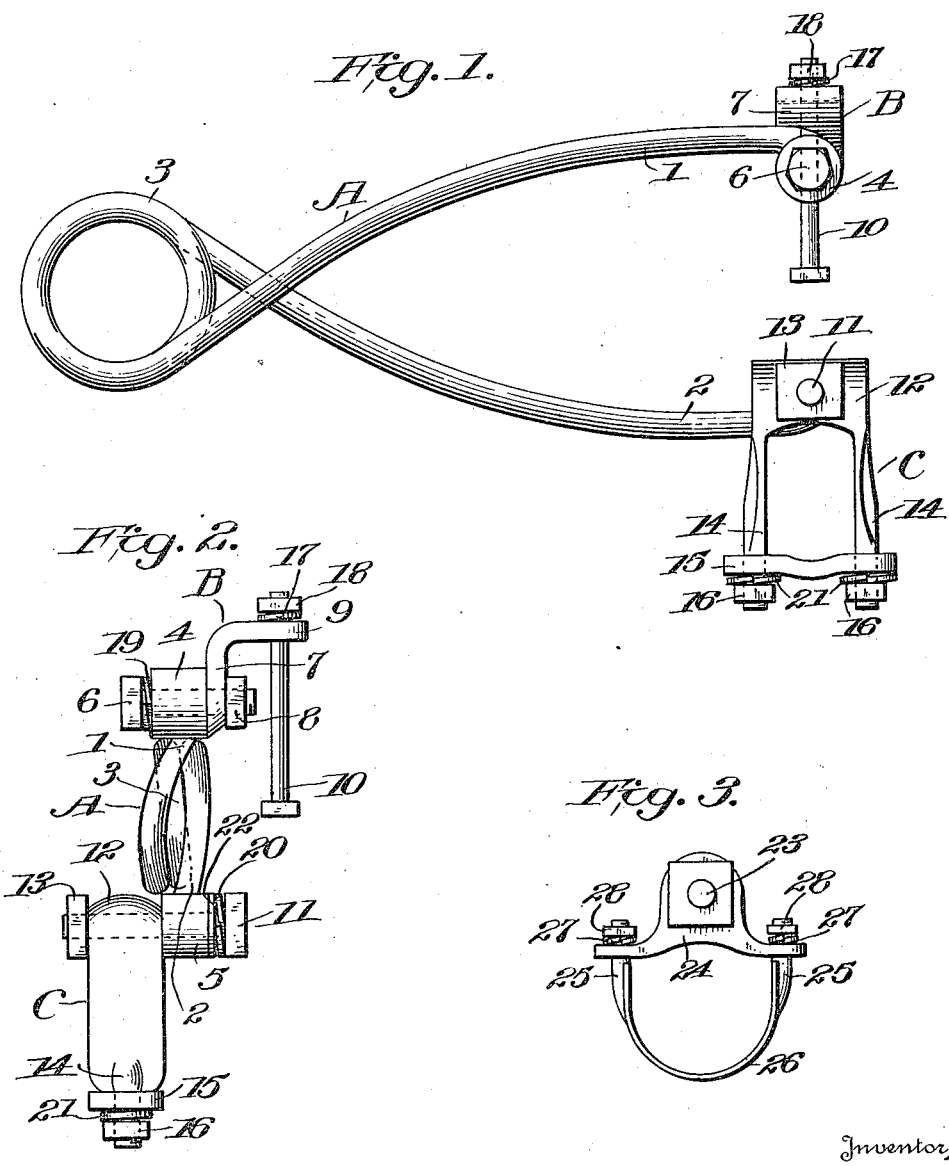

CHARLES LEE THOMAS, OF CANISTEO, NEW YORK.

AUTOMOBILE SHOCK-ABSORBER.

1,153,876.   Specification of Letters Patent.   Patented Sept. 14, 1915.

Application filed August 20, 1914. Serial No. 857,756.

*To all whom it may concern:*

Be it known that I, CHARLES L. THOMAS, a citizen of the United States, residing at Canisteo, in the county of Steuben and State of New York, have invented certain new and useful Improvements in Automobile Shock-Absorbers, of which the following is a specification.

My invention relates to shock absorbers of the metallic spring type, and my main object is to provide an article of this kind which will be noiseless in operation. Ordinarily springs of this type have a sliding movement relative to the parts which connect the spring to the vehicle and the connecting parts comprise elements which will rattle or vibrate, consequently producing considerable noise when the vehicle traverses an uneven road surface.

I have found that the object above mentioned can be carried out by pivotally connecting the spring to the parts which support the same from the vehicle and mounting the elements of the attaching parts yieldingly so that the shocks imparted to the elements will be absorbed.

I attain the foregoing object with the device illustrated in the accompanying drawing, wherein:—

Figure 1 is a side elevation of the shock absorber, Fig. 2 is an end elevation taken from the right of Fig. 1, Fig. 3 is a detail side elevation of a modified form of shackle that may be employed.

Referring specifically to the drawings, in which like reference characters designate like parts, the shock absorbing spring proper is generally designated A and comprises arms 1 and 2 and a coil at 3 from which the arms 1 and 2 extend. This spring is preferably made in one piece and bent from a yieldable rod or wire and each of the arms 1 and 2 has its free end bent into an eyelet, the eyelet of the arm 1 being designated 4 and the eyelet of the arm 2 being designated 5.

Brackets B and C are employed to connect the arms 1 and 2 to proper parts of the vehicle and it is essential that these arms be connected to the brackets so that a slight pivotal movement may occur. A bolt 6 passes through the eyelet 4 and an arm 7 of the member B. A nut 8 is mounted on the bolt 6 beyond the arm 7. This arm 7 has extending therefrom an angle arm 9 and through the angle arm 9 extends a fastening bolt 10.

A bolt 11 serves to fasten the member C pivotally to the arm 2 and this bolt extends through eyelet 5 and through a head 12 of the said member C. On the bolt 11 beyond said member C is mounted a fastening nut 13. The head 12 has depending therefrom bolt arms 14 which extend through openings of a removable cross bar 15 and beyond which bar 15 nuts 16 are mounted.

It is obvious that bolts or the equivalent, and nuts, must necessarily be employed to fasten the members B and C and in order that the nuts and bolts be anti-rattling, so as to coöperate with the pivotally mounted members B and C to render the shock absorber noiseless, a split ring or spring washer 17 is mounted on the bolt 10 between the arm 9 and the nut 18 of the bolt; a similar washer 19 is mounted on the bolt 6 intermediate its head and the eyelet 4; a spring washer 20 similar to the washer 17, is mounted on bolt 11 intermediate its head and the eyelet 5, and spring washers 21, similar to the washers 17 are mounted on the bolt arms 14 intermediate the bar 15 and nuts 16. If desired ordinary wearing washers, as seen at 22, may be employed intermediate the spring washers and the adjacent parts of the shock absorber. It will be realized that the nuts, in addition to forming fastening means, serve as means whereby the tension of the spring washers may be regulated.

It is to be understood that I do not limit myself to the specific form of shackles or fastening members B and C as these forms have been provided merely for the type of vehicle to which the shock absorber may be attached. A modified form of shackle is seen in Fig. 3, and in this figure a bolt 23 is shown which is equivalent of the bolt 11. On this bolt 23 is mounted a clamp bar 24, having an opening through which pass bolt arms 25 of a clip or shackle proper 26. On the arms 25 beyond the bar 24 are provided split spring washers 27, similar to the washers 17 and beyond these washers are mounted nuts 28.

In use, as the vehicle equipped with the shock absorber travels, road inequalities will cause the yielding of the arms 1 and 2 toward each other. When these arms yield toward each other, they have a slight pivotal movement from their fastening members B and C on the bolts 6 and 11. Fastening members B and C as will be realized, are secured to proper vehicle parts and fastened by means of the bolt 10 and the bolt arms 14 and associated parts. The nuts 16 and 18 are yieldably locked by means of the split spring washers 17 and 21. Thus the nuts 16 and 18 are fastened against removal and a yieldable means is provided between the same and the adjacent parts of the shock absorber. Due to the foregoing construction, all of the parts of the article are mounted so that undue sliding movement will not occur and so that the movement of practically all of the parts is cushioned, thus avoiding rattling incidental to vibration and overcoming the usual noise.

As merely the preferred embodiment of the invention has been illustrated and described, changes in the details of construction may be resorted to without departing from the spirit and scope of the invention.

Having described my invention what I claim and wish to secure Letters Patent upon is:

A noiseless shock absorber having a spring arm provided with an eyelet member integral with the arm, a fastening device, a bolt passing through the eyelet of the eyelet member and through the fastening device pivotally connecting the member and fastening device, a shock absorbing spring member on said bolt, a nut on said bolt, a vertically disposed bolt member on said device, a shock absorbing spring member on said bolt member, a nut on said bolt member, said nut of said bolt and said nut of said bolt member in addition to serving as fastening means, serving as means to tension the shock absorbing spring members.

In testimony whereof I affix my signature in presence of two witnesses.

CHARLES LEE THOMAS.

Witnesses:
CHARLES B. SCHAUMBERG,
HERMAN E. BUCK.

Copies of this patent may be obtained for five cents each, by addressing the "Commissioner of Patents, Washington, D. C."